(12) United States Patent
Tetlow et al.

(10) Patent No.: US 8,459,060 B2
(45) Date of Patent: Jun. 11, 2013

(54) GRAVITY BENDING GLASS SHEETS

(75) Inventors: Ian Nicholas Tetlow, Tarleton (GB);
Colin Michael Bennett, Alvechurch (GB)

(73) Assignee: Pilkington Group Limited, Merseyside (GB)

( * ) Notice: Subject to any disclaimer, the term of this patent is extended or adjusted under 35 U.S.C. 154(b) by 409 days.

(21) Appl. No.: 12/517,468

(22) PCT Filed: Nov. 27, 2007

(86) PCT No.: PCT/GB2007/050722
§ 371 (c)(1),
(2), (4) Date: Jun. 3, 2009

(87) PCT Pub. No.: WO2009/068527
PCT Pub. Date: Jun. 12, 2008

(65) Prior Publication Data
US 2010/0287989 A1  Nov. 18, 2010

(30) Foreign Application Priority Data
Dec. 4, 2006 (GB) .................................. 0624190.5

(51) Int. Cl.
*C03B 23/025* (2006.01)
*C03B 23/027* (2006.01)

(52) U.S. Cl.
CPC ............. *C03B 23/027* (2013.01); *C03B 23/025* (2013.01); *C03B 23/0252* (2013.01); *C03B 23/0256* (2013.01)
USPC ............................................. 65/107; 65/287

(58) Field of Classification Search
CPC  C03B 23/0252; C03B 23/025; C03B 23/0256; C03B 23/027

USPC ................................................... 65/106, 107
See application file for complete search history.

(56) References Cited

U.S. PATENT DOCUMENTS

| | | | |
|---|---|---|---|
| 2,925,688 | A | 2/1960 | Carson |
| 3,235,350 | A | 2/1966 | Richardson |

(Continued)

FOREIGN PATENT DOCUMENTS

| | | |
|---|---|---|
| EP | 0 448 447 B1 | 9/1991 |
| EP | 0 640 569 B1 | 3/1995 |

(Continued)

OTHER PUBLICATIONS

International Search Report (Form PCT/ISA/210) for PCT/GB2007/050772 dated Feb. 20, 2008.

(Continued)

*Primary Examiner* — Christina Johnson
*Assistant Examiner* — Cynthia Szewczyk
(74) *Attorney, Agent, or Firm* — Buchanan Ingersoll & Rooney PC (57) ABSTRACT

A gravity bending mold for bending glass sheets is disclosed. The mold comprises a final mold having a final peripheral shaping rim and an intermediate mold having an intermediate peripheral shaping rim. The final mold has a final articulated end portion having a final movable shaping rail and is mounted at an end of the mold. The intermediate mold has an intermediate articulated end portion having an intermediate movable shaping rail and is mounted at the end of the mold adjacent to the final articulated end portion. The final articulated end portion and the intermediate articulated end portion are arranged so that at least a portion of the final movable shaping rail is alignable with at least a portion of the intermediate movable shaping rail to form part of the intermediate peripheral shaping rim. There is also provided a method of bending glass sheets using such a mold.

15 Claims, 7 Drawing Sheets

U.S. PATENT DOCUMENTS

| | | | |
|---|---|---|---|
| 3,284,183 A | 11/1966 | Black et al. |
| 5,167,689 A | 12/1992 | Weber |
| 5,186,730 A | 2/1993 | Weber |
| 5,660,609 A | 8/1997 | Muller et al. |
| 5,893,941 A | 4/1999 | Nikander |
| 6,006,549 A | 12/1999 | Savka et al. |
| 6,357,263 B1 | 3/2002 | Yajima et al. |
| 6,705,116 B2 | 3/2004 | Matsuo et al. |
| 2007/0026238 A1 | 2/2007 | Chiappetta et al. |

FOREIGN PATENT DOCUMENTS

| | | |
|---|---|---|
| EP | 0885851 A | 6/1998 |
| EP | 0 705 798 B1 | 3/2000 |
| EP | 0 982 271 A1 | 3/2000 |
| EP | 0 788 466 B1 | 7/2000 |
| EP | 1 140 712 B1 | 12/2002 |
| EP | 1 626 939 | 12/2004 |
| EP | 1 380 547 B1 | 8/2005 |
| GB | 839157 | 6/1960 |
| JP | 2002-241140 A | 8/2002 |
| WO | WO 2004/103922 A1 | 12/2004 |

OTHER PUBLICATIONS

Search Report issued Apr. 5, 2007 in corresponding UK Application No. GB0624190.5.

GRAVITY BENDING GLASS SHEETS

The present invention relates to a gravity bending mould, and to an apparatus for, and a method of, gravity bending glass sheets. In particular the present invention relates to gravity bending of glass sheets, otherwise known as sag bending, in which the glass sheets are supported on a bending mould while being conveyed through a heating lehr of a glass bending furnace.

It is well known to subject glass sheets to gravity bending to shape the glass sheets for forming vehicle windows, for example automotive windows. A single glass sheet may be bent on the gravity bending mould, or two glass sheets may be bent as a stack on the gravity bending mould when the glass sheets are subsequently to be laminated together to form a laminated windscreen. Many modern automotive windows require a high degree of bending curvature at one or more edges or corners. When such a large curvature is introduced into the glass sheet or sheets, this can cause visible imperfections to be introduced into the glass sheets, reducing the optical quality of the glass sheets. Also, it may be difficult to control the bending operation consistently. Furthermore, for some applications there is a need to have a high degree of surface control so that the curved glass surface better matches the design surface. This may also ensure compatibility of a windscreen with existing windscreen wiper systems.

Furthermore, although it is possible to achieve the high degree of curvature using additional forces other than gravity, such as by using a press bending die adapted to press downwardly on the upper surface of the glass sheets, it is desirable to achieve the desired curvature by using only the force of gravity acting on the glass sheets as they soften and are caused to sag to the desired shape defined by the moulds as the sheets pass through the furnace lehr. This is because if an additional press bending die is used then the upper surface of the glass sheet is contacted during the bending operation, which may lead to a reduction in the surface quality of the glass sheets as a result of inadvertent marking of the upper surface by the die, and also the equipment costs are increased. In addition the production rate can be increased by using solely gravity bending as compared to using an additional press bending step.

On a conventional gravity bending mould for bending one or more glass sheets to form a vehicle windscreen, a central portion of the bending mould is static, and two articulated wings are mounted at opposite ends of the central portion. The central portion and the two articulated wings define a peripheral rim which supports the glass sheet or sheets along a peripheral edge of the lower glass surface. The wings are connected to counterweights which apply a rotational force to the wings, tending to rotate the wings upwardly, each about a respective pivot axis, from a substantially horizontal open initial position to a closed bent position in which the rim forms the desired bent shape of the glass sheets.

Initially, the wings are pushed downwardly to the substantially horizontal open initial position and the glass sheet or sheets are placed on the bending mould, whereby the glass sheet or sheets are supported horizontally by the portions of the peripheral rim in the wings. The assembly of the glass sheet or sheets on the gravity bending mould is then passed through a heating lehr. As the glass heats it softens and progressively sags downwardly under gravity, permitting the articulated wings progressively to be rotated upwardly about their respective pivot axes under action of the counterweights, thereby to close the mould. In the final hilly closed position, the glass sheet or sheets are supported around their entire periphery by the both the portions of the peripheral rim in the wings and by the portions of the peripheral rim in the central portion.

Sometimes a high degree of curvature is desired to be introduced into the edges or corners of the glass sheets. It is known to employ an auxiliary rim provided adjacent to the rim in the articulated wing. The auxiliary rim is either mounted on the articulated wing, or is part of an auxiliary wing which is mounted to a support for the central portion.

For example, EP-A-0885851 discloses an articulated gravity bending mould incorporating such an auxiliary rim. The auxiliary rim is located at an end of the mould and is released during the bending operation. The auxiliary rim has a larger radius of curvature than the adjacent end rail, thereby causing a small amount of cross curvature to be introduced initially and then a greater amount of cross curvature to be introduced subsequently. These two bending steps overlap in time so as to provide a transition phase between the two bending steps in which longitudinal and cross bending are simultaneously introduced. This is at least partly because the auxiliary rails are caused to drop by an internal actuation, which requires continued dynamic motion of the wings during longitudinal bending to initiate the commencement of cross curvature by dropping of the auxiliary rails. This provides the technical problem that the bending operation can be difficult to control accurately. This in turn can cause quality control problems with regard to the curvature and optical properties of the glass sheets meeting the required specification.

U.S. Pat. No. 3,235,350 discloses a gravity bending mould incorporating a pair of adjacent wing portions at each end of the central portion a gravity bending mould. The first wing portion operates in an initial bending operation and then the second wing portion takes over to complete the bending operation. This mould is complicated and not suitable for making modern vehicle windscreens of high curvature in regions located at the ends or edges of the glass sheets.

The present invention aims at least partially to overcome these problems of these known gravity bending moulds.

Accordingly, the present invention provides a gravity bending mould for bending glass sheets comprising a final mould having a final peripheral shaping rim and an intermediate mould having an intermediate peripheral shaping rim, the final mould comprising a final articulated end portion mounted at an end of the mould, the final articulated end portion having a final movable shaping rail; the intermediate mould comprising an intermediate articulated end portion mounted at the end of the mould adjacent to the final articulated end portion, the intermediate articulated end portion having an intermediate movable shaping rail; wherein the final articulated end portion and the intermediate articulated end portion are arranged so that at least a portion of the final movable shaping rail is alignable with at least a portion of the intermediate movable shaping rail to form part of the intermediate peripheral shaping rim.

The present invention also provides a gravity bending mould for bending glass sheets, the gravity bending mould comprising a final mould and an intermediate mould, the final mould comprising a first support, a final fixed portion, having at least one fixed shaping rail, mounted on the first support, and at least one final articulated end portion mounted at a respective end of the fixed portion, the or each end portion having a respective final movable shaping rail, the intermediate mould comprising a second support, an intermediate fixed portion, having at least one fixed shaping rail, mounted on the second support, and at least one intermediate articulated end portion mounted at a respective end of the fixed portion, the or each end portion having a respective intermediate movable shaping rail, a releasable lowering mechanism, interconnecting the first and second supports, adapted selectively and temporarily to dispose the intermediate mould in an initial raised position with respect to the final mould, and when released to cause relative vertical movement between the intermediate and final moulds so that the intermediate mould is in a final lowered position with respect to the final mould, and wherein at least a portion of the final movable shaping rail of the at least one final articulated end portion is alignable with at least a portion of the intermediate movable shaping rail of the at least one intermediate articulated end portion to form part of an intermediate peripheral rim of the intermediate mould when the intermediate mould is in the raised position.

The present invention further provides a glass sheet bending apparatus, the apparatus comprising a plurality of gravity bending moulds according to the present invention, a furnace, and a conveyor system for successively conveying the plurality of gravity bending moulds through the furnace, the furnace including at least one actuator mechanism provided in the furnace at a predetermined location along the furnace length, the actuator mechanism being adapted to operate the releasable lowering mechanism as each respective gravity bending mould is conveyed past the actuator mechanism.

The present invention yet further provides a method of gravity bending glass sheets, the method comprising the steps of: (a) providing a gravity bending mould comprising a final mould and an intermediate mould, the final mould having at least one final articulated end portion having a first curvature, the final articulated end portion having a final movable shaping rail; the intermediate mould having at least one intermediate articulated end portion having a second curvature, the or each intermediate articulated end portion being adjacent to a respective final articulated end portion and the second curvature thereof being lower than the first curvature of the respective final articulated end portion, (b) disposing the intermediate mould in a raised position with respect to the final mould; (c) placing at least one flat glass sheet on the intermediate mould with the or each articulated end portion of the intermediate mould being in a substantially horizontal open position, the at least one flat glass sheet being supported by at least one portion of the final movable shaping rail of the at least one final articulated end portion which forms part of an intermediate peripheral rim of the intermediate mould when the intermediate mould is in the raised position; (d) gravity bending the at least one flat glass sheet in a furnace by heating the at least one glass sheet, the heating causing softening of the at least one glass sheet thereby to gravity bend the at least one glass sheet, the gravity bending comprising two phases, (i) a first phase in which the at least one flat glass sheet is bent to an intermediate bent shape by the intermediate peripheral rim of the intermediate mould; and (ii) a second phase, after the first phase, in which the intermediate mould is in a lower position with respect to the final mould and the at least one glass sheet is bent from the intermediate bent shape to a final bent shape by the final mould.

Further advantageous embodiments of the invention will be apparent from the dependent claims.

Embodiments of the present invention will now be described by way of example only with reference to the accompanying drawings, in which.

Referring to FIGS. 1 to 7 of the drawings, there is shown a gravity bending mould 2 for bending glass sheets in accordance with an embodiment of the present invention. The gravity bending mould 2 comprises a final peripheral rim 3. The final peripheral rim 3 comprises a central portion 4 and two wing portions 6, 8. The central portion 4 of the final peripheral rim 3 is mounted on a support 10. The central portion 4 has two opposed side shaping or bending rails 11, 12 that are substantially parallel, substantially horizontal and static with respect to the support 10. One side bending rail 11 is configured to shape an upper longitudinal edge of a vehicle windscreen and the other side bending rail 12 is configured to shape a lower longitudinal edge of the vehicle windscreen.

Figure 1:
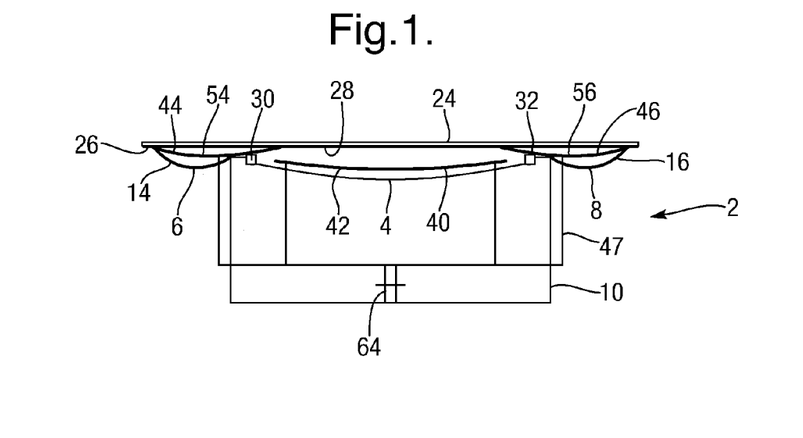
FIG. 1 is a schematic side elevation of a gravity bending mould for bending glass sheets in accordance with a first embodiment of the present invention, the gravity bending mould being in an initial position prior to the bending operation.
Figure 2:
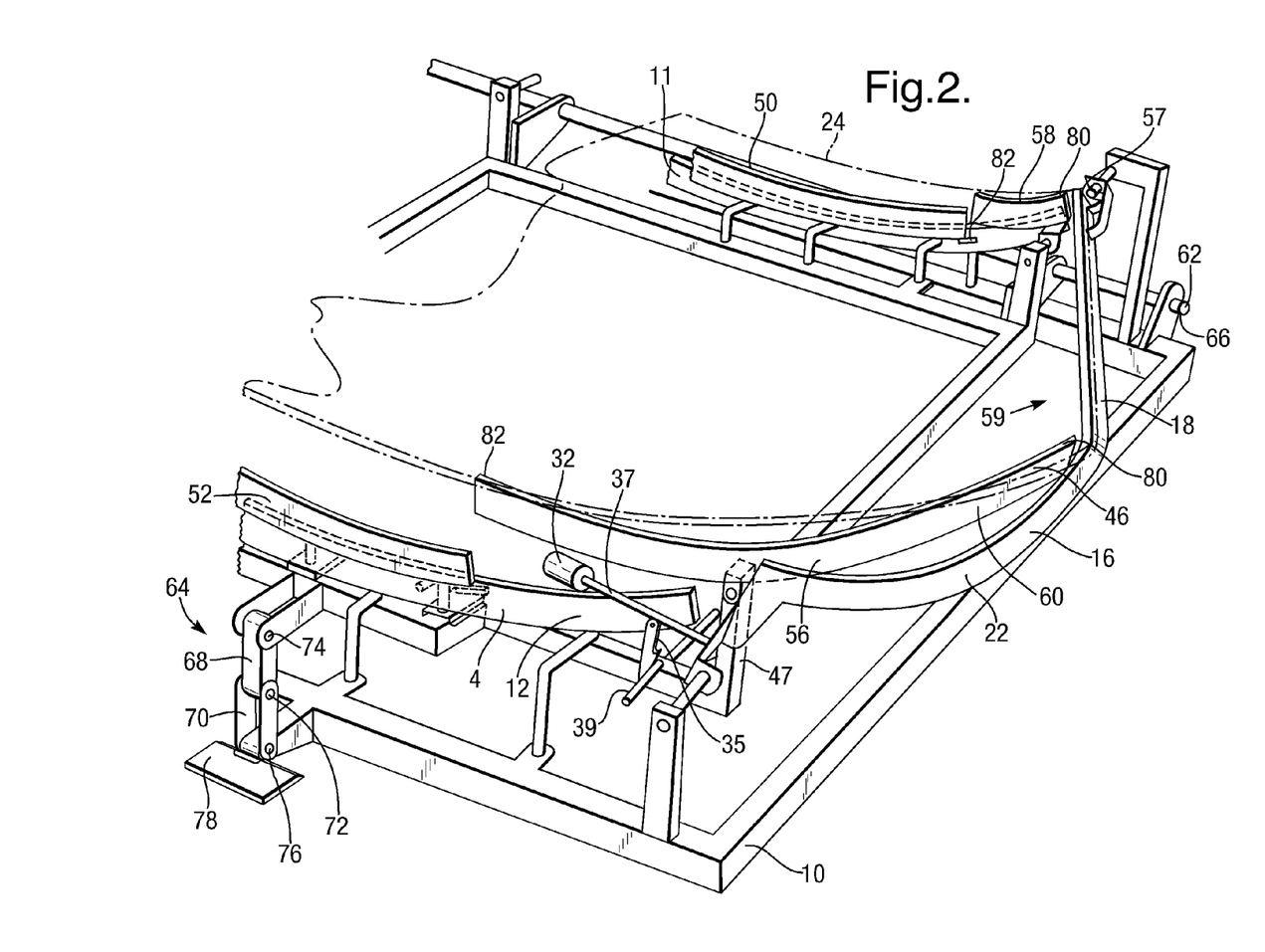
FIG. 2 is a schematic perspective view of part of the gravity bending mould of FIG. 1.

The wing portions 6, 8 are articulated and are mounted at opposite ends of the central portion 4. Each wing portion 6,8 has a respective shaping or bending rail 14,16 which is substantially L-shaped, and includes an end section 18 and one side section 22. The end section 18 is configured to shape a respective lateral transverse edge of the vehicle windscreen and the side section 22 is configured to shape longitudinal end portions of an upper longitudinal edge of the vehicle windscreen. The side section 22 has a high degree of longitudinal curvature.

In a modification of the illustrated embodiment, two opposed side sections are provided, each wing portion 6, 8 having a respective shaping or bending rail 14, 16 which is substantially U-shaped, and includes an end section 18 and two side sections 22. The end section 18 is configured to shape a respective lateral transverse edge of the vehicle windscreen and the two side sections 22 are configured to shape longitudinal end portions of, respectively, the upper and lower longitudinal edges of the vehicle windscreen. The side sections 22 each have a high degree of longitudinal curvature.

The bending rails 11, 12 of the central portion 4 and the bending rails 14,16 of the two articulated wing portions 6,8 define the final peripheral rim 3 which supports the glass sheet or sheets 24 along a peripheral edge 26 of the glass sheet lower surface 28. The wing portions 6, 8 are connected to counterweights 30, 32 which apply a rotational force on the wing portions 6, 8, tending to rotate the wing portions 6, 8 upwardly, each about a respective pivot axis defined by pivot mounts 34, 36 on the support 10. In the bending operation, the wing portions 6, 8 are rotated from a substantially horizontal open initial position, shown in FIGS. 1 and 2, to a closed bent position, shown in FIGS. 3 and 4, in which the final peripheral rim 3 forms the desired final bent shape of the glass sheets 24. The bending rails 11, 12 of the central portion 4 and the bending rails 14, 16 of the two articulated wing portions 6, 8 have a curved upper surface which corresponds to the desired shape of the periphery of the glass sheets 24 so that the curved shape of the entire final peripheral rim 3 defines, in the closed configuration of the mould 2, the final desired shape of the windscreen peripheral edge.

In accordance with the present invention, an intermediate peripheral rim 40 is provided in addition to the final peripheral rim 3. The intermediate peripheral rim 40 is located inwardly of the final peripheral rim 3, adjacent and substantially parallel thereto. The intermediate peripheral rim 40 comprises an intermediate central portion 42 and two intermediate wing portions 44, 46. The intermediate central portion 42 of the intermediate rim 40 is mounted on an intermediate support 47 in a fixed position relative thereto. The intermediate central portion 42 has two opposed intermediate side shaping or bending rails 50, 52 that are substantially parallel, substantially horizontal and static with respect to the intermediate support 47. One side bending rail 50 is configured preliminarily to shape an upper longitudinal edge of a vehicle windscreen and the other side bending rail 52 is configured preliminarily to shape a lower longitudinal edge of the vehicle windscreen.

The intermediate wing portions 44, 46 are articulated about axes and are mounted on the intermediate support 47 at opposite ends of the intermediate central portion 42. Each intermediate wing portion 44, 46 has a respective shaping or bending rail 54, 56 which includes two side sections 58, 60. The two side sections 58, 60 are configured preliminarily to shape longitudinal end portions of, respectively, the upper and lower longitudinal edges of the vehicle windscreen. The two side sections 58, 60 are spaced to define a gap 59 therebetween in which the end section 18 of the respective wing portion 6, 8 that define the final peripheral rim 3 is received when the intermediate peripheral rim 40 is in the raised position. The intermediate wing portions 44, 46 are therefore not provided with an end section. Instead, the only peripheral rim portion at an end section of the gravity bending mould 2 is provided by the end sections 18 of the wing portions 6, 8 that define the final peripheral rim 3.

The two side sections 58, 60 have a lower degree of longitudinal curvature than, respectively, the end portions of the side rail 50 and the side section 22, and introduce a preliminary degree of longitudinal curvature to an intermediate bent glass shape defined by the intermediate peripheral rim 40.

The intermediate support 47 is mounted on the support 10 so as to be vertically movable relative thereto under the action of gravity between a raised position and a lowered position. The intermediate peripheral rim 40 is correspondingly moved between a raised position and a lowered position relative to the final peripheral rim 3.

The intermediate support 47 and the support 10 have provided therebetween a hinge assembly 62 along one longitudinal edge and a releasable lowering mechanism 64 along the other longitudinal edge which permits the above-described relative vertical motion therebetween. The hinge assembly 62 has an elongate horizontal axis provided by a shaft 66. The releasable lowering mechanism 64 comprises a pair of link elements 68, 70 pivotally linked together by a pivot 72 at a central part of the releasable lowering mechanism 64 and each respectively pivotally linked, by a respective pivot 74, 76, at the other end thereof to the intermediate support 47 and the support 10. The link element 70 pivotally linked to the support 10 is provided with an outwardly extending integral release plate 78.

The releasable lowering mechanism 64 between the intermediate support 47 and the support 10 can be moved between a raised position and a lowered position correspondingly with the raising and lowering of the intermediate support 47. In the raised position, the link elements 68, 70 are aligned substantially vertically and the pivots 72, 74, 76 are aligned substantially vertically. The link elements 68, 70 selectively and temporarily lock the intermediate support 47, and consequently the intermediate peripheral rim 40, in the raised position. In this position, the release plate 78 is substantially horizontal.

When it is desired to release the intermediate support 47 and permit it to drop under the action of gravity to the lowered position, the release plate 78 is pushed downwardly to be rotated into a downwardly inclined position. This correspondingly causes downward rotation of the lower link element 70 about pivot 76, which in turn rotates the upper link element 70 about pivot 74, in the opposite rotational direction as a result of the pivotal motion about central pivot 72. The resultant collapsible scissor action of the link elements 68, 70 on such release causes the intermediate support 47 to drop downwardly.

The articulated intermediate wing portions 44, 46 of the intermediate peripheral rim 40 are rotationally movable between an open position and a closed position. In the open position the two side sections 58, 60 of each intermediate wing portion 44, 46 are substantially horizontal, the two opposed ends 80, 82 of each of the side sections 58, 60 being configured to support an initial flat glass sheet 24.

Each of the intermediate wing portions 44, 46 has a laterally outwardly extending flange 45 that has an upper surface 49 adapted to bear against a lower surface 51 of the respective adjacent articulated wing portion 6, 8 of the final peripheral rim 3. In the raised position of the intermediate peripheral rim 40, the flange 45 interlocks the movement of the articulated intermediate wing portions 44, 46 of the intermediate peripheral rim 40 and the respective adjacent articulated wing portions 6,8 of the final peripheral rim 3 during an initial bending phase, described hereinafter. The upper surface 55 of the ends 80 of the two side sections 58, 60 of each intermediate wing portion 44, 46 coincides with the upper surface 57 of the adjacent portion of the final peripheral rim 3, which is at the corner junction between the end section 18 and, respectively, the end portion of the side rail 50 and side section 22.

Figure 4:
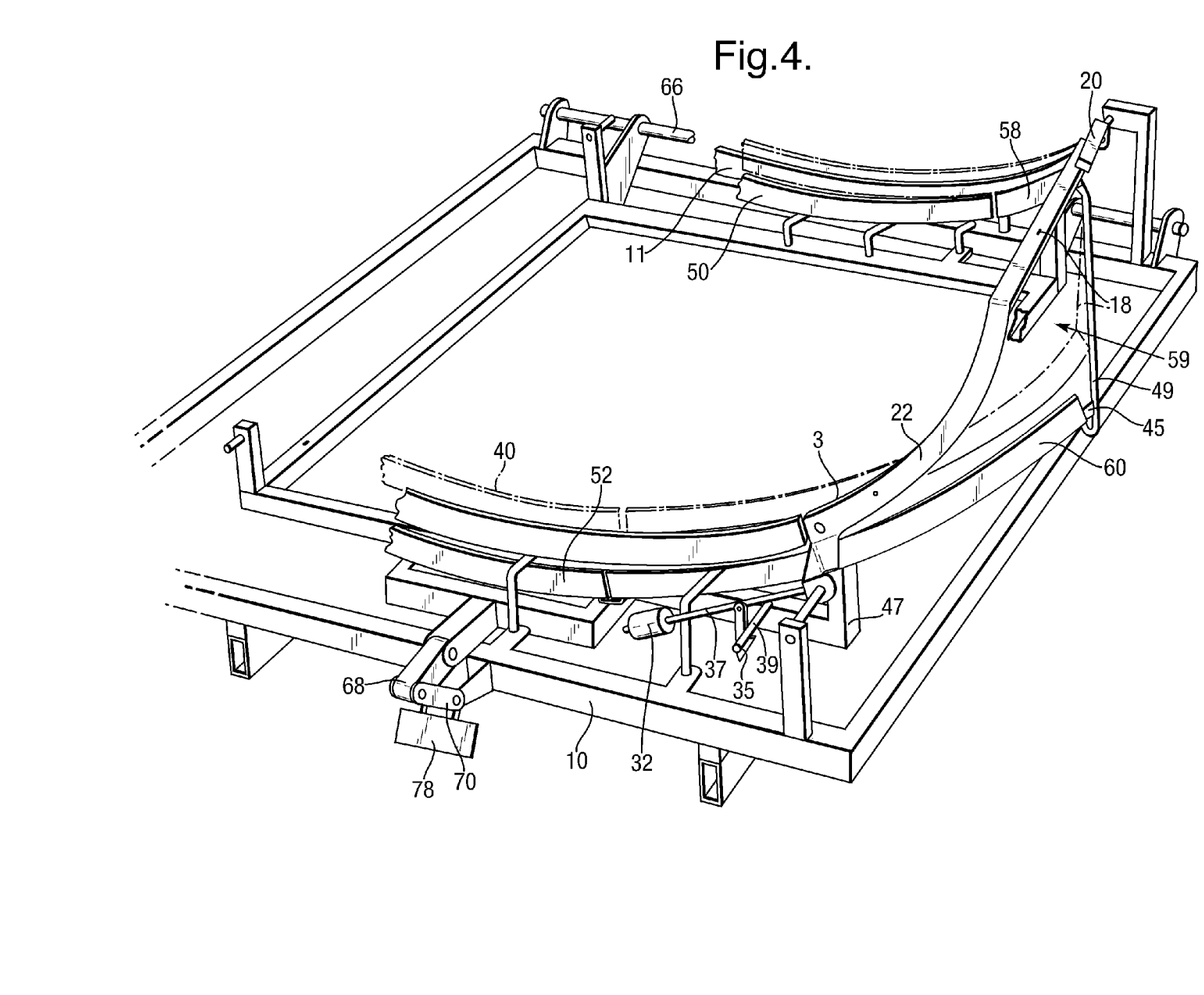
FIG. 4 is a schematic perspective view of part of the gravity bending mould of FIG. 3.

In the closed position of the intermediate peripheral rim 40, shown in phantom in FIG. 4, the upper surfaces of the two side sections 58, 60 are respectively aligned with the upper surfaces of the two opposed intermediate side shaping rails 50, 52 of the intermediate central portion 42 to define a continuous intermediate curved shape for the peripheral edge of the glass sheets 24. A stop member 53 on the intermediate central portion 42 prevents over-rotation of the respective articulated intermediate wing portion 44, 46 and ensures that the articulated intermediate wing portion 44, 46 terminates in the closed position of the intermediate peripheral rim 40.

In the raised position of the intermediate peripheral rim 40 carried on the intermediate support 47, the upper shaping surface 50 of the intermediate peripheral rim 40 is higher than that of the final peripheral rim 3 except that at least the ends of the end section 18 of the wing portion 6, 8 of the final peripheral rim 3 are at the same height as the ends 80 of the side sections 58, 60 of the intermediate wing portions 44, 46. In the lowered position of the intermediate peripheral rim 40, the upper shaping surface 50 of the intermediate peripheral rim 40 is lower than that of the final peripheral rim 3 along its entire length.

The wing portions 6, 8 of the final peripheral rim 3 can each be latched by a respective latch 35 that cooperates between a weight arm 37 carrying the respective counterweight 30, 32 and a peg 39 on the intermediate support 47. The latching holds up the final peripheral rim 3, and in particular the end sections 18 of the wing portions 6, 8 thereof that define the glass edges at the A-pillar of the windscreen, after the preliminary bending step on the intermediate peripheral rim 40. When the intermediate support 47 is in the raised position, as shown in FIG. 2, the latch 35 is not engaged with the peg 39. The upward movement of the wing portions 6, 8 during the preliminary shaping on the intermediate peripheral rim 40 is achieved by the biasing force from the counterweights 30, 32. However, when the intermediate support 47 is in the lowered position, as shown in FIG. 4, the latch 35 engages with the peg 39 to provide a locking upward force on the wing portions 6, 8. This latching keeps the wing portions 6, 8 at an upper limit position corresponding to the desired position of the wing portions 6, 8 after the final peripheral rim 3 has closed completely to a final curved shape defining a final curvature for the glass sheets.

During the preliminary moulding of the glass sheets 24 on the intermediate peripheral rim 40, the end section 18 remains in contact with the glass sheets 24 because at least the ends of the end section 18 are at the same height as the ends of the side sections 58, 60 as a result of operation of the flange 45. After engagement of the latch 35, which occurs by dropping of the intermediate support 47, the counterweights 30, 32 are urged to rotate further downwardly under a greater applied force than their own weight, thereby assisting the wing portions 6, 8 to continue to rotate upwardly away from the intermediate position towards a final desired position of the wing portions 6, 8 defining a final curvature for the glass sheets by the final peripheral rim 3, and the wing portions 6, 8, have closed completely.

Figure 8:
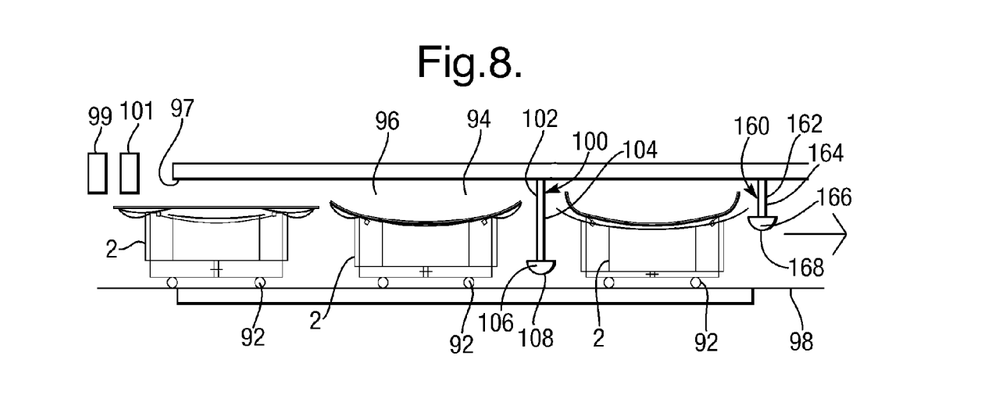
FIG. 8 is a schematic side elevation of a plurality of the gravity bending moulds of the embodiment of FIG. 1 passing through a furnace for bending glass sheets in accordance with the present invention.

As is known in the art, as shown in FIG. 8, a series of bending moulds 2 are provided, each being mounted on a respective carriage 92 which is conveyed, in turn, through a heating lehr 94 of a glass bending furnace 96 by a conveyor system 98.

In accordance with the invention, an actuator mechanism 100 is provided in the furnace 96 at a predetermined location along the furnace length. The actuator mechanism 100 is adapted to operate the release plate 78 of the releasable lowering mechanism 64 as the respective bending mould 2 passes thereby. Typically, the actuator mechanism 100 comprises an elongate member 102, such as a metal bar 104 carrying a flange 106 at its end, the flange 106 having a downwardly directed curved cam surface 108. The actuator mechanism 100 pushes the release plate 78 downwardly as the bending mould 2 is conveyed past the actuator mechanism 100. This causes the releasable lowering mechanism 64 to be released at a specific point of time in the glass bending operation, which in turn causes the intermediate peripheral rim 40, carried on the intermediate support 47, to drop under the action of gravity from the raised position to the lowered position with respect to the final peripheral rim 3.

In addition, upstream of the furnace entrance 97 is located a first priming actuator 99, illustrated schematically in FIG. 8. Before, or after in some embodiments, the glass sheets are loaded onto the bending mould, the first priming actuator 97 engages the mould 2 to dispose the intermediate peripheral rim 40 in the raised position prior to passage of the bending mould 2 through the furnace. This priming actuator 72 primes the bending mould 2 ready for the first phase of the bending operation, whereas the first actuator mechanism 100 initiates the commencement of the second phase of the bending operation.

The glass bending operation will now be described.

Figure 5:
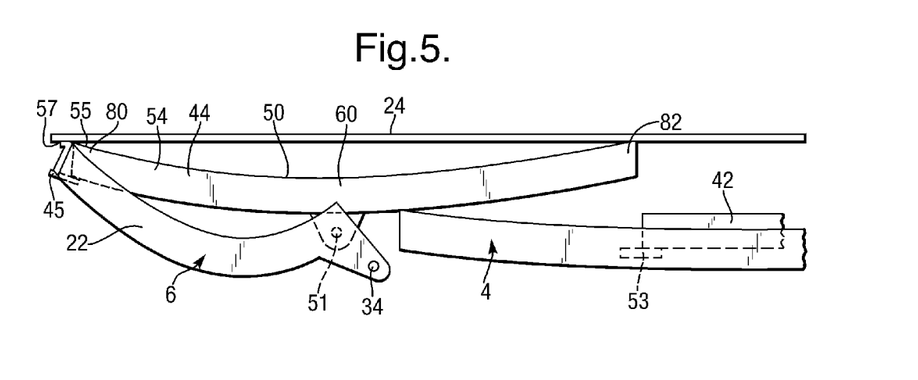
FIGS. 5, 6 and 7 are schematic side elevations of part of the gravity bending mould of the embodiment of FIG. 1 in an initial, intermediate and final position respectively.

Initially, the intermediate peripheral rim 40 carried on the intermediate support 47 is disposed in the raised position, e.g. by the first priming actuator 99 and supported in that position by the releasable lowering mechanism 64. The wing portions 6, 8 of the final peripheral rim 3 and the intermediate wing portions 44, 46 of the intermediate rim 40 are pushed downwardly to the substantially horizontal open initial position as shown in FIGS. 1, 2 and 5. The initial planar glass sheet or sheets 24 are placed on the bending mould 2, whereby the flat glass sheet or sheets 24 are supported horizontally by at least the ends of the end sections 18 of the final peripheral rim 3 and by the ends 80, 82 of the side sections 58, 60 of the intermediate wing portions 44, 46 of the intermediate peripheral rim 40.

The assembly of the glass sheet or sheets 24 on the gravity bending mould 2 is then passed through the heating lehr 94. As the glass heats it softens and progressively sags downwardly under gravity, permitting the articulated wing portions 6, 8 progressively to be rotated upwardly about their respective pivot axis under action of the counterweights 30, 32, thereby progressively to bend the glass sheet or sheets 24 and close the mould 2.

Figure 6:
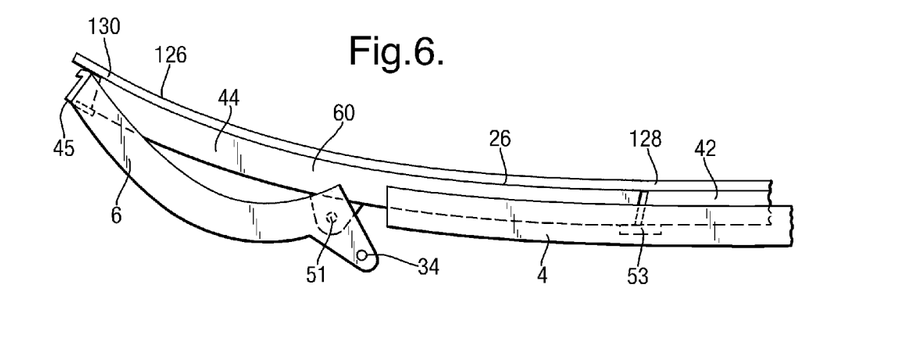

During a first phase of the glass bending operation, the ends of the glass sheet or sheets 24 are supported on the end sections 18 of the wing portions 6, 8 of the final peripheral rim 3 and on the side sections 58, 60 of the intermediate wing portions 44, 46 of the intermediate peripheral rim 40. As the wing portions 6, 8 pivot upwardly, the wing portions 44, 46 correspondingly pivot by the interlocking action between the flange 45 of the intermediate peripheral rim 40 and the final peripheral rim 30. The lower glass surface sags into contact with the end sections 18 of the wing portions 6, 8 of the final peripheral rim 3, the side sections 58, 60 of the intermediate wing portions 44, 46 of the intermediate peripheral rim 40, and the intermediate side shaping rails 50, 52 of the intermediate central portion 42. The intermediate wing portions 44, 46 rotate to their stop position defined by the stop member 53. This closes the intermediate peripheral rim 40 to its final configuration, and forms an intermediate curved shape for the glass sheet or sheets 24. This is shown in FIG. 6.

The ends 126 of the glass sheet or sheets 24 are given a relatively low preliminary longitudinal curvature in the first phase, which is significantly lower that the final longitudinal curvature in the ends 126. The central portion 128 of the glass sheet or sheets 24 is given a relatively low preliminary longitudinal curvature in the first phase, which is substantially similar to the final longitudinal curvature in the central portion 128. In the first phase, both the ends 126 of and the central portion 128 of the glass sheet or sheets 24 are given a relatively low preliminary cross curvature in the first phase, which is substantially similar to the final cross curvature. In the first phase, the lateral peripheral edges 130 of the glass sheet or sheets 24 are bent to their final curvature.

After the desired preliminary curvature has been introduced completely by full closing of the intermediate peripheral rim 40, in a subsequent second phase of the glass bending operation the intermediate peripheral rim 40 is released by operation of the actuator mechanism 100, external of and separate from the bending mould 2, which is located in the furnace 96 at the predetermined location along the furnace length. The actuator mechanism 100 operates the release plate 78 as the respective bending mould 2 passes thereby, causing the releasable lowering mechanism 64 to be released, which in turn causes the intermediate peripheral rim 40 on the intermediate support 47 to drop under the action of gravity from the raised position to the lowered position with respect to the final peripheral rim 3.

The dropping of the intermediate support 47 engages the latch 35 by the peg 39 so that the final peripheral rim 3, and in particular the wing portions 6, 8 thereof, is locked and supported in a final closed position.

Figure 3:
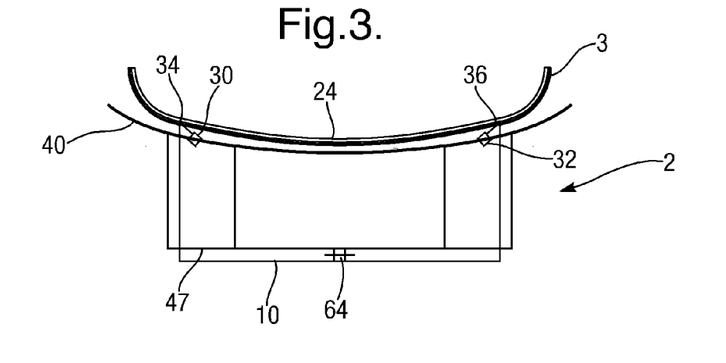
FIG. 3 is a schematic side elevation of the gravity bending mould of FIG. 1 in a closed, finally bent, configuration.
Figure 7:
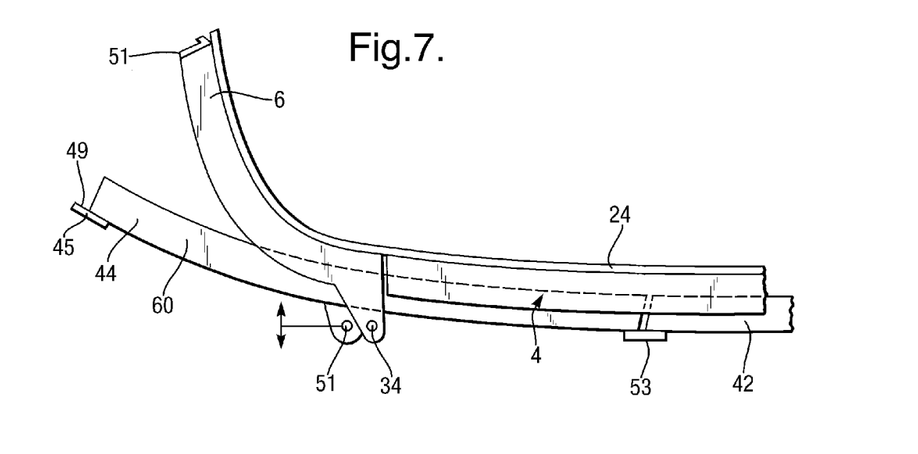

As the intermediate peripheral rim 40 drops downwardly, the preliminarily bent glass sheet or sheets 24 are supported solely by the final peripheral rim 3. Initially in the second phase, only the lateral peripheral edges 130 of the glass sheet or sheets 24 are supported, in particular by the end sections 18. Thereafter in the second phase, the glass sheet or sheets 24 are progressively bent further to a final curvature and sag by gravity into contact with the remainder of the final peripheral rim 3. In particular, the side sections 22 introduce a high degree of longitudinal curvature to the final bent glass shape, in particular in the end portions 126. The final configuration is shown in FIGS. 3, 4 and 7.

This enables the glazing ends to be bent to the desired high degree of longitudinal curvature defined by the shape of the side sections 20, 22 only after the preliminary longitudinal shaping to a lower degree of longitudinal curvature has been completed by the side sections 58, 60 of the intermediate peripheral rim 40.

This completes the bending operation. The mould and bent glass thereon pass through the remainder of the furnace, undergoing a conventional annealing and cooling schedule. After the bending mould 2 exits the furnace, the bent glass sheets 24 are removed from the bending mould 2 and allowed to cool. The bending mould 2 is returned to the entrance of the furnace, primed and loaded with flat glass sheets in a subsequent glass bending cycle.

In the first embodiment, the upper shaping surface of each end section 18 has only a low degree of curvature, or even has no curvature and is linearly flat. Consequently, at the beginning of the bending operation, or shortly thereafter, the lower surface 28 of the glass sheet 24 contacts the upper shaping surface of each end section 18. This ensures that the lower surface 28 of the glass sheet 24 is constantly and commonly in contact with a significant proportion of the final peripheral rim 3 throughout a significant proportion of the entire bending operation. This is because the end section 18 acts as a common shaping section of the peripheral rim 3 which is employed in both the initial shaping phase and the final shaping phase. This ensures a high degree of positional accuracy of the glass sheet 24 on the gravity bending mould 2 because the common contact of the lower surface 28 with a significant length of the final peripheral rim 3 during the bending operation tends to prevent any inadvertent shifting or sliding movement of the glass sheet 24 on the gravity bending mould 2.

In accordance with a second embodiment of the present invention, a modified end rail structure is provided when the upper shaping surface of each end section 18 has a higher degree of curvature than in the first embodiment. Such a modified structure ensures, as for the first embodiment, that the lower surface 28 of the glass sheet 24 is constantly and commonly in contact with a significant proportion of the final peripheral rim 3 throughout a significant proportion of the entire bending operation, with the end rail acting as a common shaping section of the peripheral rim 3 which is employed in both the initial shaping phase and the final shaping phase. This again ensures a high degree of positional accuracy of the glass sheet 24 on the gravity bending mould 2 during the bending operation which tends to prevent any inadvertent shifting or sliding movement of the glass sheet 24 on the gravity bending mould 2.

Referring therefore to FIGS. 9 to 13, in which for clarity the intermediate mould is not shown, in accordance with the second embodiment of the present invention an auxiliary end rail 140 is provided on each wing portion 6, 8 of the final peripheral rim 3. The auxiliary end rail 140 is mounted adjacent and substantially parallel to a respective end section 18 of the respective wing portion 6, 8. In accordance with the embodiment illustrated in FIGS. 9 to 13, the auxiliary end rail 140 is mounted to the end section 18 laterally inwardly of the end section 18, by means of a series of spaced slider mounts 142 that are adapted to permit substantially vertical sliding movement of the entire auxiliary end rail 140 with respect to the respective end section 18. Each auxiliary end rail 140 can move between a raised, supported position (FIGS. 9 to 11) and a lowered unsupported position (FIGS. 12 and 13) relative to the respective end section 18. Each slider mount 142 comprises a substantially horizontal pin 143 fixed to the end section 18 and slidably received in a substantially vertical slot 145 in the respective auxiliary end rail 140.

Such relative sliding motion may sometimes be inhibited by mechanical interference, for example by inadvertent catching or rubbing of insulating material on one or both of the parts, between the respective auxiliary end rail 140 and the respective end section 18 which would inhibit a free dropping action of the auxiliary end rail 140 relative to the respective end section 18 as described in detail hereinafter.

Figure 14:
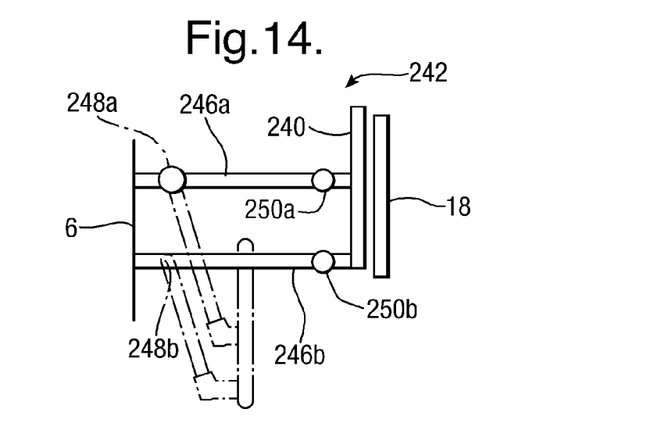
FIG. 14 is a schematic side elevation of an alternative embodiment of the mounting of auxiliary end rail on the articulated wing of the gravity bending mould.

Accordingly, to avoid such mechanical interference, FIG. 14 shows a schematic side elevation of an alternative third embodiment of the mounting of auxiliary end rail 240 on the articulated wing portion 6, 8 of the gravity bending mould 2. In this embodiment, the auxiliary end rail 240 is mounted to the end section 18 laterally inwardly of the end section 18, by means of a series of spaced pivot mounts 242 that are adapted to permit substantially arcuate movement of the entire auxiliary end rail 240 with respect to the respective end section 18. The mounts 242 are spaced along each end section 18/auxiliary end rail 240 pair in a manner similar to the mounts 142 of the second embodiment. Each auxiliary end rail 240 can move between a raised, supported position and a lowered unsupported position relative to the respective end section 18. Each pivot mount 242 comprises upper and lower parallel pivot arms 246a, 246b, each pivotally mounted at a respective first pivot 248a, 248b to the respective wing portion 6, 8 and at a respective second pivot 250a, 250b to the respective auxiliary end rail 240. The first pivots 248a, 248b and the second pivots 250a, 250b have substantially horizontal pivot axes. The provision of parallel pivot arms ensures that the auxiliary end rails 138, 140 move smoothly in a defined arc and is maintained in a vertical configuration through the arcuate movement. This ensures that the auxiliary end rails 138, 140 do not inadvertently engage the wing portions during their arcuate downward motion.

When moving from the raised, supported position shown in solid lines in FIG. 14 to the lowered unsupported position shown in phantom in FIG. 14, each pivot arm 246a, b rotates downwardly in a first rotational sense (e.g. clockwise in FIG.

14) about the first pivot 248a, b and the respective auxiliary end rail 240 rotates about the second pivot 250a, b a second opposite rotational sense (e.g. anticlockwise in FIG. 14). This causes the auxiliary end rail 240 to be moved laterally away from the respective end section 18 during the dropping motion. Such lateral movement reduces the possibility of any mechanical interference, for example by inadvertent catching or rubbing of insulating material on one or both of these parts, between the respective auxiliary end rail 240 and the respective end section 18 which would inhibit a free dropping action.

For the second embodiment, a similar structure being present in the third embodiment, a tripping support mechanism 146 selectively and temporarily supports the auxiliary end rail 140 in a raised position with respect to the respective end section 18. The support mechanism 146 can be temporarily locked in the support position, and can be subsequently released by a latch mechanism 148 connected thereto. The latch mechanism 148 is adapted to release the support for the auxiliary end rail 140 so that the auxiliary end rail 140 drops under the action of gravity from the raised position to a lowered position with respect to the respective end section 18.

In the illustrated embodiment, each auxiliary end rail 140 is automatically pushed upwardly into the raised position with respect to the respective end section 18 and the support mechanism 146 is automatically locked in the support position when the wing portions 6, 8 are opened prior to the loading operation for the flat glass sheets 24.

In the illustrated embodiment, the upper surface 150 of the auxiliary end rail 140 is flat, or at least substantially flat, so that the auxiliary end rail 140 introduces no, or at least substantially no, transverse curvature to the glass sheets 24 during the bending operation. However, some relatively minor degree of curvature may be present in the upper surface 150 of the auxiliary end rail 140. In contrast, the upper surface 151 of the adjacent end section 18 has a higher degree of curvature that the upper surface 150 of the auxiliary end rail 140.

In the raised position (see FIGS. 9 to 11) the upper surface 150 of the auxiliary end rail 140 is, in a central portion thereof, higher than the upper surface 151 of the respective end section 18, but at the opposed longitudinal ends of the auxiliary end rail 140 the upper surface 150 coincides in height with the upper surface 151 of the respective wing portion 6, 8 at the opposed ends of the end section 18. In contrast, in the lowered position shown in FIGS. 12 and 13, the upper surface 150 of the auxiliary end rail 140 is lower than the upper surface 151 of the respective end section 18.

In accordance with the invention, as shown in FIG. 8, a second actuator mechanism 160 is provided in the furnace 56 at a predetermined location along the furnace length, downstream of the first actuator mechanism 100. The second actuator mechanism 160 is adapted to operate the latch mechanism 148 as the respective bending mould 2 passes thereby. Typically, the second actuator mechanism 160 comprises an elongate member 162, such as a metal bar 164 carrying a flange 166 at its end, the flange having an inwardly directed curved cam surface 168. The second actuator mechanism 160 pushes the latch mechanism 148 as the bending mould 2 is conveyed past the second actuator mechanism 160. This causes the support mechanism 146 to be released at a specific point of time in the glass bending operation, which in turn causes the respective auxiliary end rail 140 to drop under the action of gravity from the raised position to a lowered position with respect to the respective end section 18.

In addition, upstream of the furnace entrance 97 is located a second priming actuator 101, illustrated schematically in FIG. 8. Before, or after in some embodiments, the glass sheets are loaded onto the bending mould, the second priming actuator 101 engages the mould 2 to dispose the auxiliary end rails 140 in the raised position prior to passage of the bending mould 2 through the furnace. This second priming actuator 101 primes the bending mould 2 ready for the first and second phases of the bending operation, whereas the second actuator mechanism 160 initiates the commencement of the third phase of the bending operation.

The glass bending operation for the second and third embodiments will now be described.

In the first embodiment the gravity bending is carried out in two phases, a first phase in which the at least one flat glass sheet is bent to an intermediate bent shape by the intermediate peripheral rim of the intermediate mould; and a second phase, after the first phase, in which the intermediate mould is in a lower position with respect to the final mould and the at least one glass sheet is bent from the intermediate bent shape to a final bent shape by the final mould.

In the second and third embodiments the gravity bending is carried out in three phases, a third phase following the aforesaid first and second phases. In the first and second phases the opposed ends of the glass sheet are supported on the auxiliary ends rails, so that in these two phases the opposed ends have no, or substantially no, cross curvature introduced thereinto. The opposed ends are supported throughout the first and second phases by contact with the auxiliary end rail. In the third phase, after the second phase, the auxiliary ends rails are dropped away from the glass sheet, and the opposed ends are permitted to sag downwardly into contact with the curved upper surface of the end sections. This introduces significant cross curvature into the opposed ends of the glass sheet.

Figure 9:
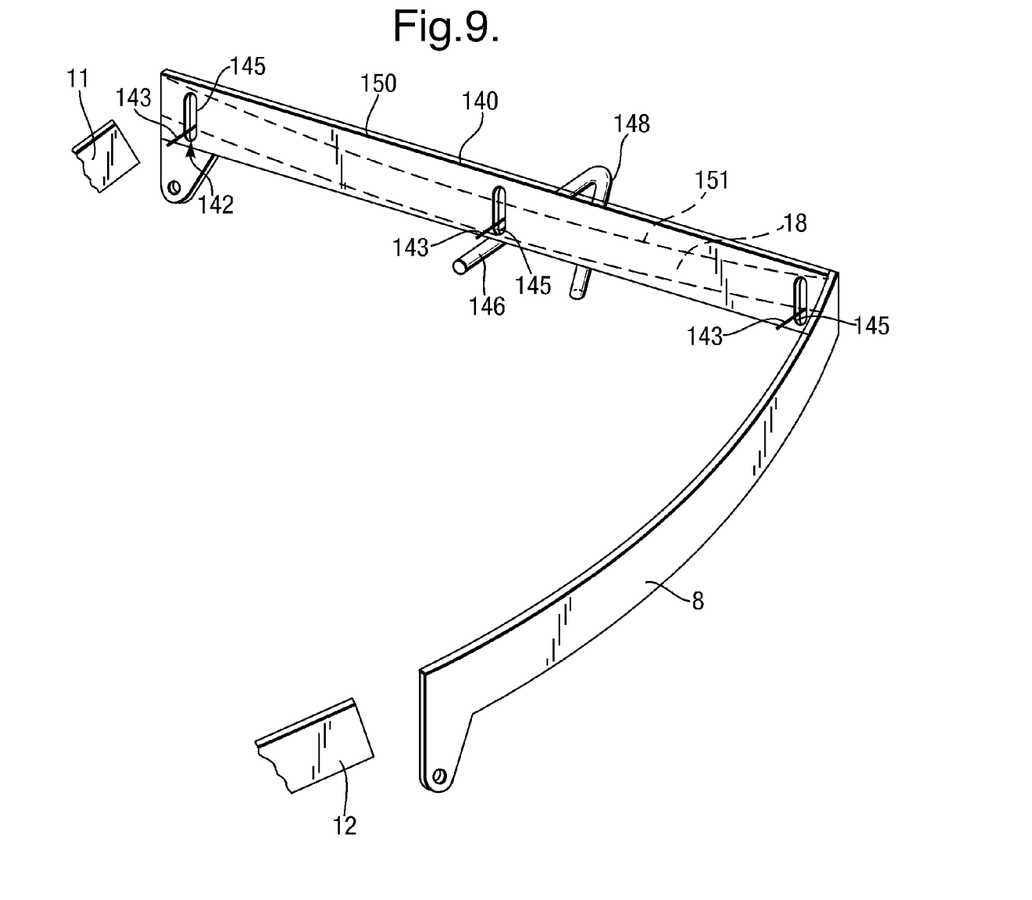
FIGS. 9 and 10 are, respectively, a schematic perspective view and a schematic end view of one of the articulated wings of a gravity bending mould n accordance with a second embodiment of the present invention showing an auxiliary end rail mounted to an end rail of the articulated wing of the final peripheral rim, the articulated wing and the auxiliary end rail both being in an initial position prior to the bending operation.
Figure 10:
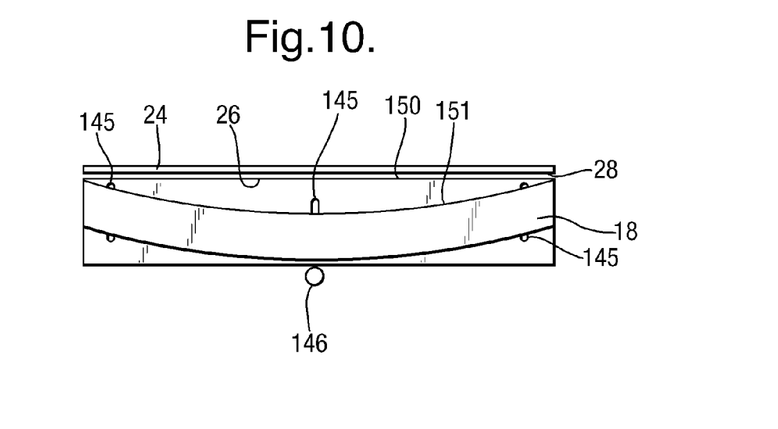
Figure 11:
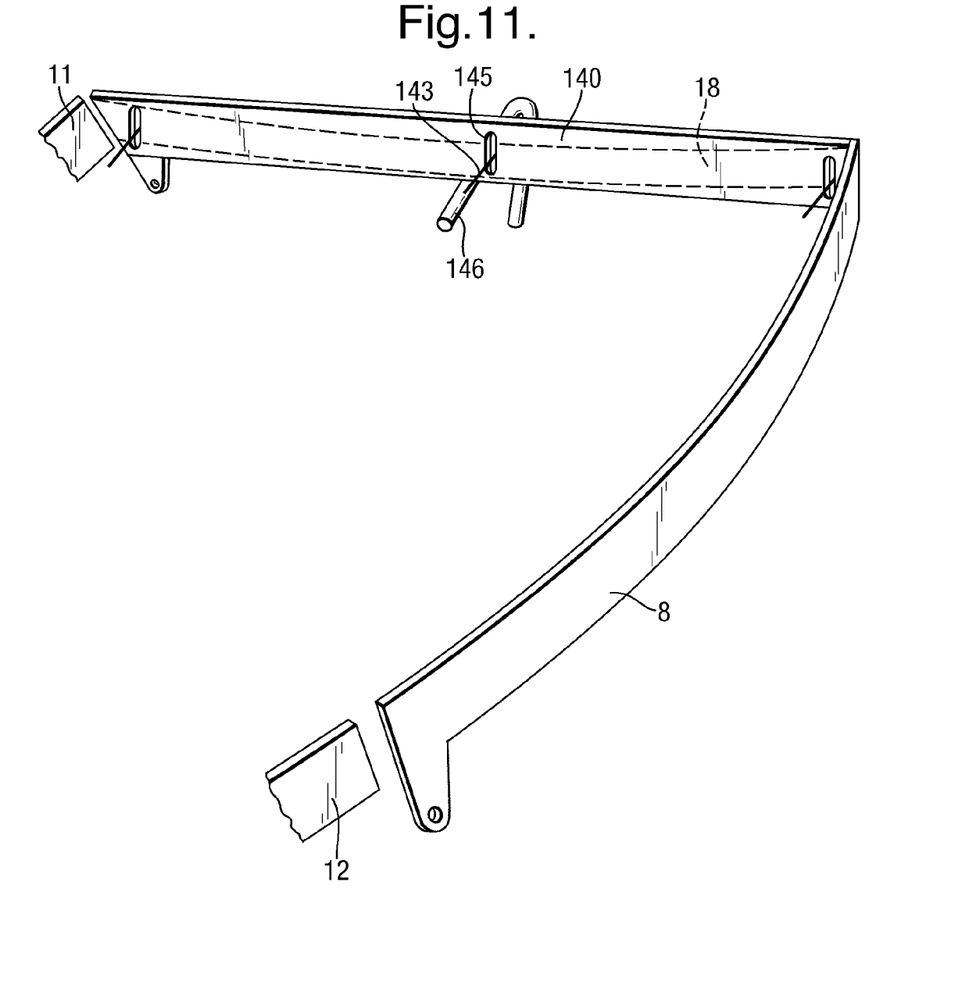
FIG. 11 is a schematic perspective view of the articulated wing of FIGS. 9 and 10 showing the articulated wing and the auxiliary end rail in an intermediate position during the bending operation, after completion of a second phase of three successive phases of the bending operation.

Initially, at the beginning of the first phase, shown in FIGS. 9 and 10, the auxiliary end rails 140 are disposed in the raised position and supported in that position by the support mechanism 146, e.g. by the second priming actuator 101. The initial planar glass sheet or sheets 24 are supported horizontally at their opposed longitudinal ends on the auxiliary end rails 140.

The assembly of the glass sheet or sheets 24 on the gravity bending mould 2 is then passed through the heating lehr 94. As the glass heats it softens and progressively sags downwardly under gravity, permitting the articulated wings 6, 8 progressively to be rotated upwardly about their respective pivot axis under action of the counterweights 30, 32, thereby progressively to bend the glass sheet or sheets 24 and close the mould 2.

As described above, in the first phase the glass sheet sags into contact with the intermediate peripheral rim 40 of the intermediate mould and in the second phase the intermediate mould has been dropped downwardly below the final mould and the glass sheet sags into contact with the final peripheral rim 3 of the final mould.

During the first and second phases of the glass bending operation, the ends of the glass sheet or sheets 24 are supported on the auxiliary end rails 140 of the final mould. Since the upper surfaces 150 of the auxiliary end rails 140 are linearly straight or substantially linearly straight, no, or substantially no, transverse or cross curvature is introduced into the glass sheet or sheets 24 during the first and second phases of the glass bending operation. During the first and second phases of the glass bending operation, the two wing portions 6, 8 pivot upwardly fully to the closed position, as discussed above with respect to the first embodiment, to provide the necessary longitudinal curvature prior to any movement of the auxiliary end rails 140 relative to the respective end section 18. The glass sheets 24 sag under gravity so as to contact, and be supported by, the final peripheral rim 3 around the entire periphery of the glass sheets 24 at the end of the second phase.

In these first and second phases of the glass bending operation, the ends of the glass sheet or sheets 24 are not bent to give any cross curvature because they are supported on the linearly straight horizontal auxiliary end rails 140. Instead, the ends of the glass sheet or sheets 24 remain constantly substantially planar throughout the first and second phases.

Figure 12:
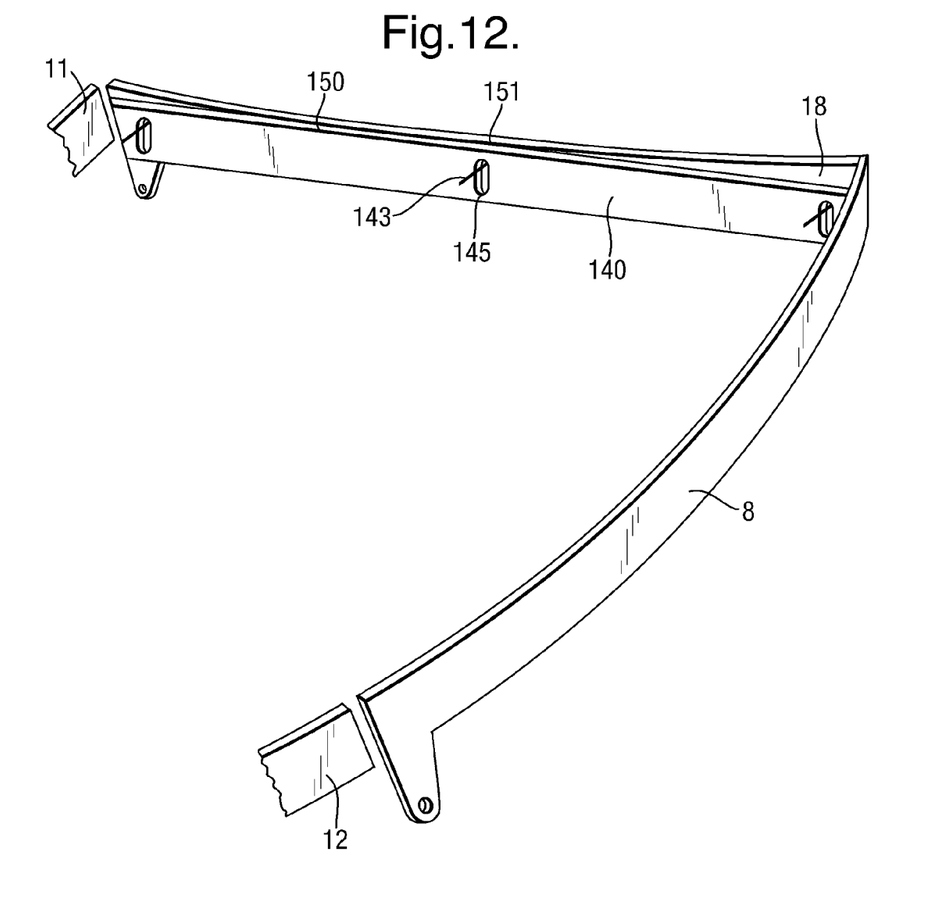
FIGS. 12 and 13 are, respectively, a schematic perspective view and a schematic end view of the articulated wing of FIGS. 9 and 10 showing the articulated wing and the auxiliary end rail in a final position at the end of the bending operation.
Figure 13:
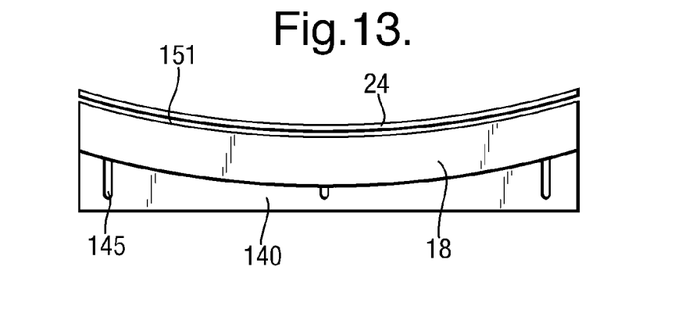

After the desired longitudinal curvature has been introduced completely by full closing of the articulated bending mould 2, as shown in FIGS. 12 and 13 in the third phase of the glass bending operation the auxiliary end rails 140 are released by operation of the second actuator mechanism 160, external of and separate from the bending mould 2, which is located in the furnace 56 at the predetermined location along the furnace length. The second actuator mechanism 160 operates the latch mechanism 148 as the respective bending mould 2 passes thereby, causing the support mechanism 146 to be released, which in turn causes the respective auxiliary end rail 140 to drop under the action of gravity from the raised position to the lowered position with respect to the respective end section 18. This enables the glazing ends to be bent to the desired cross curvature defined by the shape of the end sections 18 in a third phase only after the longitudinal shaping has been completed in the first and second phases. The glazing ends sag into contact with the end sections 18. This completes the bending operation. The mould and bent glass thereon pass through the remainder of the furnace, undergoing a conventional annealing and cooling schedule.

After the bending mould 2 exits the furnace, the bent glass sheets 24 are removed from the bending mould 2 and allowed to cool. The bending mould 2 is returned to the entrance of the furnace, primed and loaded with flat glass sheets in a subsequent glass bending cycle.

Although the illustrated embodiments show a gravity bending mould for bending glass sheets to form a windscreen, having symmetric wing portions on opposite ends of a central portion, it will be apparent to those skilled in the art that other gravity bending mould configurations may be employed in accordance with the present invention. For example, only a single wing may be provided, or alternatively the opposed wings may not be symmetrical. In addition, the or each wing may have only two sides, as opposed to three sides (to form the U-shape) as shown in the illustrated embodiment. Yet further, the inclination of the various rails to the longitudinal direction of the gravity bending mould may be varied. Also, the intermediate peripheral rim may be mounted laterally outwardly of the final peripheral rim.

In the illustrated embodiment, the intermediate rim drops under the action of gravity when released so as to commence the second phase of the bending operation, the final rim being in a fixed vertical position. However, the present invention may alternatively provide that the final rim is configured to move upwardly with respect to the intermediate rim, the latter being in a fixed vertical position. In either case, there is relative vertical motion between the intermediate rim and the final rim going from the first phase to the second phase of the bending operation, and the raised final rim takes over the bending operation from the intermediate rim.

In accordance with the present invention, a minority, in particular a low proportion, of the longitudinal curvature of the highly curved parts of the final glazing is introduced into the glass sheets in a first preliminary shaping phase and a majority, in particular a high proportion, of the longitudinal curvature of the highly curved parts of the final glazing is introduced into the glass sheets in a second final shaping phase. The two bending phases are separate. This separation, and the initiation of the second phase, is readily controlled within the furnace by use of an actuator external of the mould to trip the release plate to release the intermediate preliminary rim at a precise period within the bending operation. This provides the technical advantage of greater control over the bending operation, but still using a simple bending mould structure. The provision of a common part of the intermediate and final peripheral rims, that is the end rail of the final rim in the illustrated embodiment, contacting and supporting the glass sheets throughout the entire bending operation provides a stable support for the glass sheets and a controlled transition from the preliminary peripheral rim, defining an intermediate curvature, to the final peripheral rim, defining a final curvature.

In the embodiments described herein, the final mould and the intermediate mould each have a fixed portion. However it will be readily apparent to one skilled in the art that the final mould and the intermediate mould may comprise no fixed portions. For example, the gravity bending mould may have an intermediate mould having only two intermediate articulated end portions and a final mould having only two final articulated end portions. The gravity bending mould may therefore comprise a final mould having a final peripheral shaping rim and an intermediate mould having an intermediate peripheral shaping rim. The final mould comprises a final articulated end portion mounted at an end of the mould, which has a final movable shaping rail. The intermediate mould comprises an intermediate articulated end portion mounted at the end of the mould adjacent to the final articulated end portion, which has an intermediate movable shaping rail. The final articulated end portion and the intermediate articulated end portion are arranged so that at least a portion of the final movable shaping rail is alignable with at least a portion of the intermediate movable shaping rail to form part of the intermediate peripheral shaping rim.

Alternatively, the gravity bending mould may have a fixed portion that is common to the final mould and the intermediate mould, the fixed portion having a fixed shaping rail wherein the fixed shaping rail forms part of the intermediate shaping rim and the final shaping rim. The fixed portion may be a straight rail. The fixed portion may be a 'U' shaped rail in which case the final articulated end portion is mounted at the open end of the 'U', with the intermediate articulated end portion being mounted adjacent to the final articulated end portion. For a gravity bending mould having a 'U' shaped fixed portion, only one end of the glass sheet will be subject to the method of bending in accordance with the present invention.

As an alternative, the gravity bending mould may comprise a final mould that has a final fixed portion having a final fixed shaping rail and an intermediate mould that has an intermediate fixed portion having an intermediate fixed shaping rail, the final fixed shaping rail forming part of the final peripheral shaping rim and the intermediate fixed shaping rail forming part of the intermediate peripheral shaping rim. The final fixed portion may be in mechanical communication with the intermediate fixed portion via a releasable lowering mechanism adapted selectively and temporarily to dispose the intermediate mould in an initial raised position with respect to the final mould, and which when released causes relative vertical movement between the intermediate and final moulds, such that when the intermediate mould is in the raised position, the intermediate peripheral shaping rim comprises a portion of the final movable shaping rail. The gravity bending mould may be configured such that the final fixed portion is mounted on a first support, the intermediate fixed portion is mounted on a second support, the final articulated end portion is mounted at an end of the final fixed portion, the intermediate articulated portion is mounted at the end of the intermediate fixed portion adjacent to the final articulated end portion, and the releasable lowering mechanism interconnects the first and second supports.

The present invention has particular application in the manufacture of vehicle windscreens for which a high degree of curvature is desired to be introduced into the edges or corners of the glass sheets.

The embodiments of the present invention provide the technical advantage that a division of the glass bending in the longitudinal direction is achieved, so that high longitudinal curvature is introduced in a separate phase at the end of the glass bending operation. This can enhance the optical quality of the bent glass sheets and of vehicle glazing produced therefrom. In particular, kinks and inverse curvature, the latter resulting from reverse bending, can be substantially eliminated, in particular from regions of high curvature. Furthermore, the problem of inadvertent lift of the lower glass surface from the peripheral rim can be avoided. In summary, these benefits permit the production of glass sheets of high curvature with enhanced properties.

In accordance with the second and third embodiments of the present invention, in addition all of the longitudinal curvature is introduced into the glass sheets prior to any (or substantially any) cross curvature being introduced. The longitudinal bending and cross (transverse) bending are separate. This separation, and the initiation of the third phase, is readily controlled within the furnace by use of an actuator external of the mould to trip the latch mechanism to release the auxiliary end rails at a precise period within the bending operation. This provides the technical advantage of greater control over the bending operation, but still using a simple bending mould structure.

These embodiments of the present invention further provide the technical advantage that a separation of the glass bending in the longitudinal and cross (transverse) directions is achieved. This can further enhance the optical quality of the bent glass sheets and of vehicle glazing produced therefrom. In particular, by completing the longitudinal bending before commencing the cross bending, kinks and inverse curvature, the latter resulting from reverse bending, can be substantially eliminated, in particular from regions of high curvature. Furthermore, the problem of inadvertent lift of the lower glass surface from the peripheral rim can be avoided. In summary, these benefits permit the production of glass sheets of high curvature with enhanced properties.

Yet further, these enhanced properties can be achieved using a low cost mould in a readily controllable production, and at a high production rate.

In the illustrated second and third embodiments, the auxiliary rail drops under the action of gravity when released so as to commence the third phase of the bending operation. However, the present invention may alternatively employ an auxiliary rail having a fixed vertical position, and instead the final ring (or an articulated wing thereof) may be configured to move upwardly with respect to the auxiliary rail. In either case, there is relative vertical motion between the auxiliary rail and the adjacent peripheral rail going from the second phase to the third phase of the bending operation, and the raised adjacent peripheral rail takes over the bending operation from the lowered auxiliary rail.

The invention claimed is:

1. A gravity bending mould for bending glass sheets, the gravity bending mould comprising a final mould and an intermediate mould, the final mould comprising a first support, a final fixed portion, having at least one fixed shaping rail, mounted on the first support, and at least one final articulated end portion mounted at a respective end of the fixed portion, the or each end portion having a respective final movable shaping rail, the intermediate mould comprising a second support, an intermediate fixed portion, having at least one fixed shaping rail, mounted on the second support, and at least one intermediate articulated end portion mounted at a respective end of the fixed portion, the or each end portion having a respective intermediate movable shaping rail, a releasable lowering mechanism, interconnecting the first and second supports, adapted selectively and temporarily to dispose the intermediate mould in an initial raised position with respect to the final mould, and when released to cause relative vertical movement between the intermediate and final moulds so that the intermediate mould is in a final lowered position with respect to the final mould, and wherein at least a portion of the final movable shaping rail of the at least one final articulated end portion is alignable with at least a portion of the intermediate movable shaping rail of the at least one intermediate articulated end portion to form part of an intermediate peripheral rim of the intermediate mould when the intermediate mould is in the raised position.

2. A gravity bending mould according to claim 1, wherein the final movable shaping rail of the final mould has a higher curvature than the intermediate movable shaping rail of the intermediate mould.

3. A gravity bending mould according to claim 1, wherein the portion of the final movable shaping rail of the final articulated end portion comprises an end section of the final movable shaping rail of the final mould.

4. A gravity bending mould according to claim 3, wherein the end section of the final movable shaping rail of the final mould is alignable with a gap defined by the intermediate movable shaping rail.

5. A gravity bending mould according to claim 4, wherein the gap is located between two spaced side sections of the intermediate movable shaping rail of the intermediate mould.

6. A gravity bending mould according to claim 1 further comprising an auxiliary rail mounted on the final articulated end portion, the auxiliary rail being mounted adjacent to a respective section of the final movable shaping rail by at least one mount that is adapted to permit movement of the auxiliary rail with respect to the final movable shaping rail, a tripping mechanism for selectively and temporarily disposing the auxiliary rail in a raised position with respect to the final movable shaping rail, and a latch mechanism connected to the support mechanism, the latch mechanism being adapted to be engaged by an external actuator to cause relative vertical movement of the auxiliary rail with respect to the respective section of the respective final movable shaping rail by operation of the tripping mechanism, so that the auxiliary rail is subsequently disposed in a lowered position with respect to the respective section of the respective final movable shaping rail.

7. A gravity bending mould according to claim 6, wherein an upper shaping surface of the auxiliary rail is substantially flat.

8. A gravity bending mould according to claim 7 wherein in the raised position the upper surface of the auxiliary rail, is, in a central portion thereof, higher than the upper surface of the respective section, and at the opposed longitudinal ends of the auxiliary rail the upper surface of the auxiliary rail substantially coincides in height with the upper surface of the respective final movable shaping rail.

9. A glass sheet bending apparatus, the apparatus comprising a plurality of gravity bending moulds according to claim 1, a furnace, and a conveyor system for successively conveying the plurality of gravity bending moulds through the furnace, the furnace including at least one actuator mechanism provided in the furnace at a predetermined location along the furnace length, the actuator mechanism being adapted to operate the releasable lowering mechanism as each respective gravity bending mould is conveyed past the actuator mechanism.

10. A method of gravity bending glass sheets, the method comprising:
   (a) providing a gravity bending mould comprising a final mould and an intermediate mould, the final mould having at least one final articulated end portion having a first curvature, the final articulated end portion having a final movable shaping rail; the intermediate mould having at least one intermediate articulated end portion having a second curvature, the or each intermediate articulated end portion being adjacent to a respective final articulated end portion and the second curvature thereof being lower than the first curvature of the respective final articulated end portion,
   (b) disposing the intermediate mould in a raised position with respect to the final mould;
   (c) placing at least one flat glass sheet on the intermediate mould with the or each articulated end portion of the intermediate mould being in a substantially horizontal open position, the at least one flat glass sheet being supported by at least one portion of the final movable shaping rail of the at least one final articulated end portion which forms part of an intermediate peripheral rim of the intermediate mould when the intermediate mould is in the raised position;
   (d) gravity bending the at least one flat glass sheet in a furnace by heating the at least one glass sheet, the heating causing softening of the at least one glass sheet thereby to gravity bend the at least one glass sheet, the gravity bending comprising two phases,
      (i) a first phase in which the at least one flat glass sheet is bent to an intermediate bent shape by the intermediate peripheral rim of the intermediate mould; and
      (ii) a second phase, after the first phase, in which the intermediate mould is in a lower position with respect to the final mould and the at least one glass sheet is bent from the intermediate bent shape to a final bent shape by the final mould.

11. A method according to claim 10 wherein the at least one portion of the final movable shaping rail of the at least one final articulated end portion comprises an end section of the final movable shaping rail of the final mould.

12. A method according to claim 11 wherein an intermediate movable shaping rail of the intermediate mould comprises a gap in which, in the raised position of the intermediate mould, the end section of the final movable shaping rail of the final mould is received.

13. A method according to claim 12 wherein the gap is located between two spaced side sections of the intermediate movable shaping rail of the intermediate mould.

14. A method according to claim 10 wherein in the first and second phases which substantially all of the longitudinal curvature is introduced by gravity bending the at least one glass sheet by articulation of the at least one articulated end portion of the final mould to the final articulated position and at least one lateral edge of the at least one glass sheet is supported and substantially prevented from developing a cross curvature by gravity bending; and the method further comprises a third phase, after the second phase, in which the at least one lateral edge of the at least one glass sheet is permitted to develop a final cross curvature by gravity bending.

15. A method according to claim 14 wherein in the first and second phases the at least one lateral edge of the at least one glass sheet is supported by an auxiliary rail mounted on the final movable shaping rail of the at least one articulated end portion of the final mould, an upper surface of the auxiliary rail being is disposed above an adjacent upper surface of the final movable shaping rail, and in the third phase the auxiliary rail is disposed below the final movable shaping rail to permit the at least one lateral edge of the at least one glass sheet to gravity bend into contact with the adjacent upper surface of the final movable shaping rail.

* * * * *